C. S. ASH.
CAP NUT FOR VEHICLE WHEELS.
APPLICATION FILED JULY 14, 1916. RENEWED MAY 17, 1918.

1,319,683.

Patented Oct. 28, 1919.

WITNESSES

INVENTOR
Charles S. Ash
BY
ATTORNEYS

UNITED STATES PATENT OFFICE.

CHARLES S. ASH, OF BUFFALO, NEW YORK, ASSIGNOR, BY MESNE ASSIGNMENTS, TO WIRE WHEEL CORPORATION OF AMERICA.

CAP-NUT FOR VEHICLE-WHEELS.

1,319,683.  Specification of Letters Patent.  Patented Oct. 28, 1919.

Application filed July 14, 1916, Serial No. 109,277. Renewed May 17, 1918. Serial No. 235,206.

*To all whom it may concern:*

Be it known that I, CHARLES S. ASH, a citizen of the United States, residing at Buffalo, in the county of Erie and State of New York, have invented certain new and useful Improvements in Cap-Nuts for Vehicle-Wheels, of which the following is a full, clear, and exact description, such as will enable others skilled in the art to which it appertains to make use of the same.

This invention relates to wheel parts, and more particularly to an improved hub cap and nut for securing together the separable parts of quick-detachable wheels. The nut is designed especially for detachable wire wheels used on automobile or similar vehicles.

Certain of the objects of the invention are to provide a simplified and improved hub nut of durable construction and by a method enabling its manufacture at lowered cost.

Other objects and advantages will be in part obvious and in part noted hereinafter in connection with the description of the accompanying drawing, which illustrates a typical embodiment of the invention, and wherein—

Figure 1:
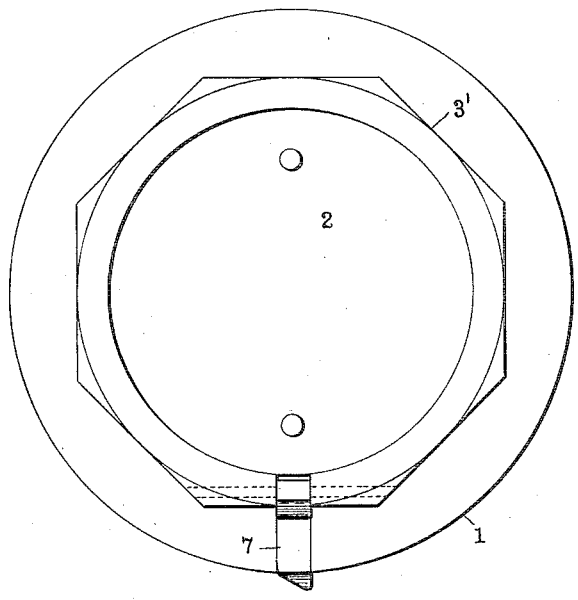
Figure 1 is an end view of the improved hub nut.
Figure 2:
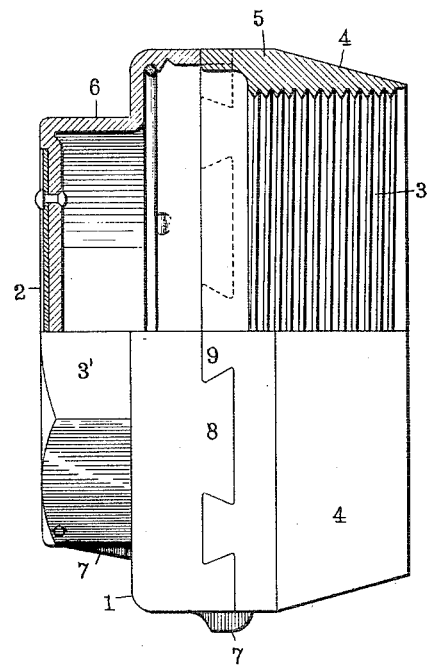
Fig. 2 is a side view thereof, partially in section.

Referring more particularly to the drawing, there is shown a cap nut 1 having its outer end 2 closed and its inner end interiorly threaded at 3 and exteriorly tapered at 4. The cap in use is threaded upon a complementary threaded driving hub and wedges into engagement at surface 4 with a complementary tapered bearing portion of a detachable hub shell. In order to facilitate the wedging action mentioned it is desirable that the inner portion 5 of the nut be of relatively yieldable metal. The outer part 6, however, constitutes the extremity of the hub and therefore should be of rigid metal capable of withstanding any reverse shocks or blows.

In the present embodiment, the nut comprises an outer tubular part 6 of pressed or stamped steel, and an inner tubular part 5 of cast alloy. The part 6 is shaped with a polygonal extremity 3' for manipulation by a suitable wrench when the cap is attached to or detached from the hub and also preferably carries a locking pawl 7 of the character shown and described in the co-pending application of Charles S. Ash, filed July 14, 1916, Serial No. 109,277. In manufacturing the cap nut, the part 6 is first stamped from sheet metal and its inner edge 8 provided with a plurality of dove tail or other non-circular recesses 9. Thereafter the part 5 is cast to the part 6 in such a manner that the recesses 9 are filled with the cast metal and the parts 5 and 6 thereby firmly interlocked together. The cap may then be readily machined to provide the exterior taper 4 and the internal threading 3 in the cast part 5.

It will be noted that by the construction described the cap can be cheaply manufactured, and while the part 5 is of relatively soft metal, and therefore capable of contraction in operation to grip the hub parts of the wheel against relative axial or rotative movement, the nut as a whole is of unitary and, in effect, integral construction. The material of the inner portion 5 is rust-proof, which insures durability of the threads and prevents sticking or freezing to the hub in use, and the outer part 6 of pressed steel eliminates machining and thereby reduces the cost.

Having described my invention, what I claim as new and desire to secure by Letters Patent, is:—

1. In a hub cap for vehicle wheels, an exterior protective portion of stamped or pressed metal having dovetail recesses at its inner edge, and a screw-threaded portion of cast metal interlocking with said recesses, substantially as described.

2. In a hub cap for quick detachable wheels, an exterior polygonal portion of stamped metal, and an interiorly threaded portion of relatively soft metal cast to said stamped portion, said stamped portion being adapted to receive an operating wrench, and said cast portion having a beveled extremity about its threads adapted for contraction.

3. A two part hub cap comprising an exterior portion of hard metal shaped to receive an operating wrench and an interior portion of relatively soft metal securely joined thereto, said second named portion being internally threaded.

4. A two part hub cap comprising an exterior portion and an interior portion of relatively soft metal securely joined thereto, said second named portion being internally threaded and having a beveled extremity.

5. A two part hub cap for securing together the hub parts of a quick detachable wheel, comprising an exterior portion shaped for manipulation by a wrench and a threaded interior portion having a beveled extremity of relatively soft metal firmly joined to said exterior portion and capable of contraction to grip the hub part against relative movement.

6. A two part hub cap for securing together the hub parts of a quick detachable wheel, comprising an exterior hard metal portion shaped for manipulation by a wrench and a threaded interior portion of relatively soft metal firmly joined to said exterior portion and capable of contraction to grip the hub parts against relative movement.

In testimony whereof I affix my signature, in the presence of two witnesses.

CHARLES S. ASH.

Witnesses:
G. W. HOUK,
H. WATSON.